T. W. DELANEY.
DRIVING AND STEERING GEAR FOR VEHICLES.
APPLICATION FILED JAN. 21, 1918.
1,269,401.
Patented June 11, 1918.
4 SHEETS—SHEET 4.
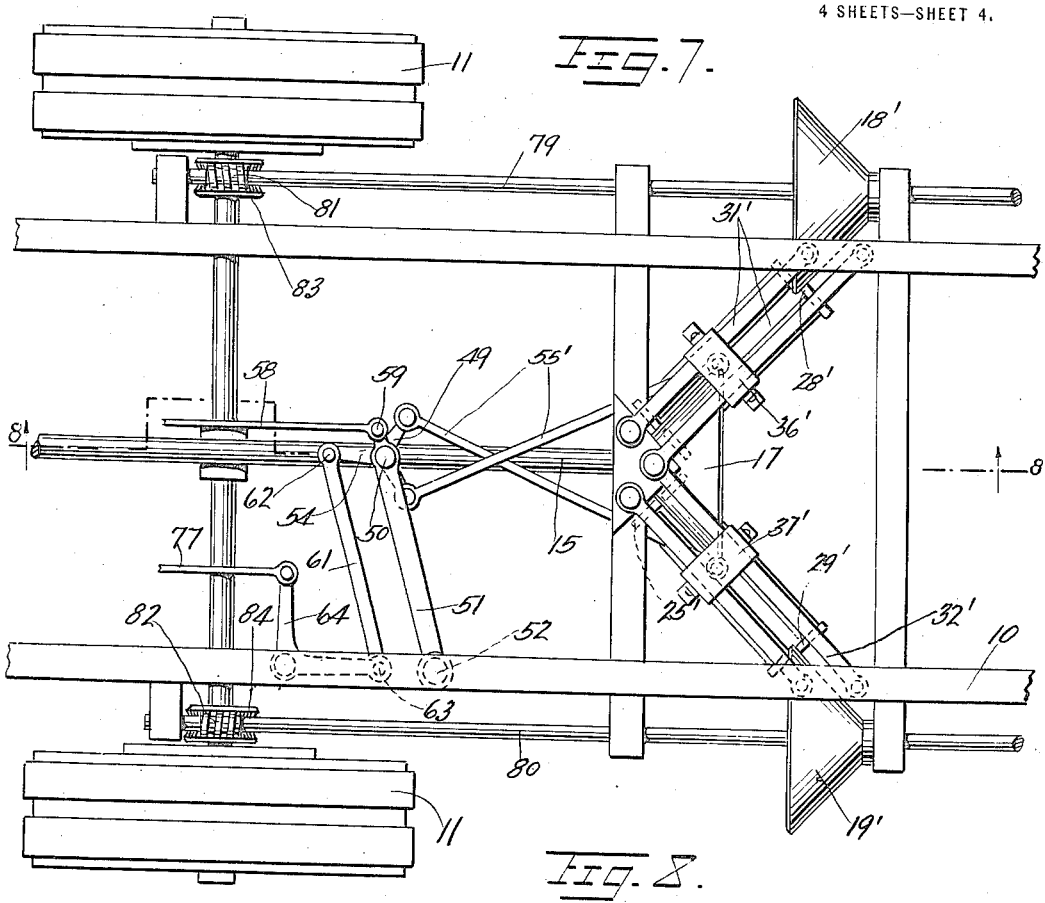
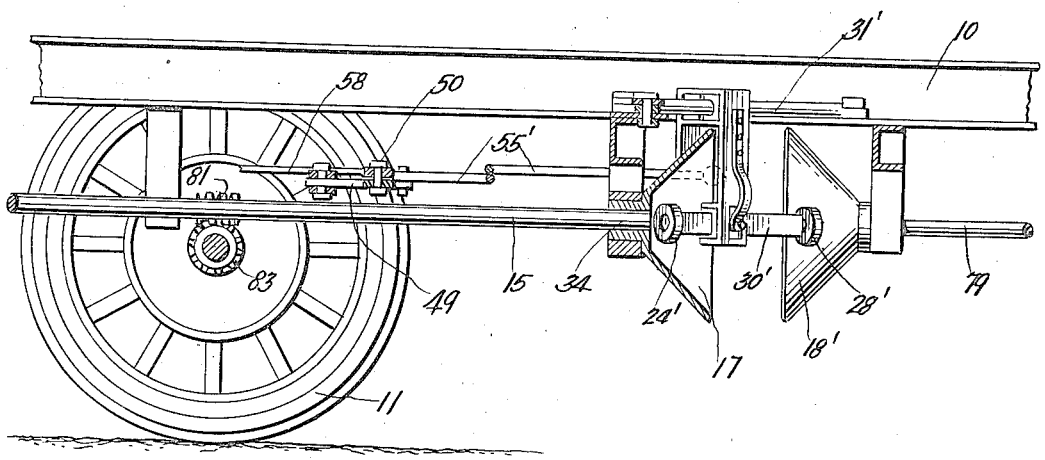
WITNESSES
H. T. Walker
Geo. V. Beelen
INVENTOR
T. W. Delaney
BY
ATTORNEYS

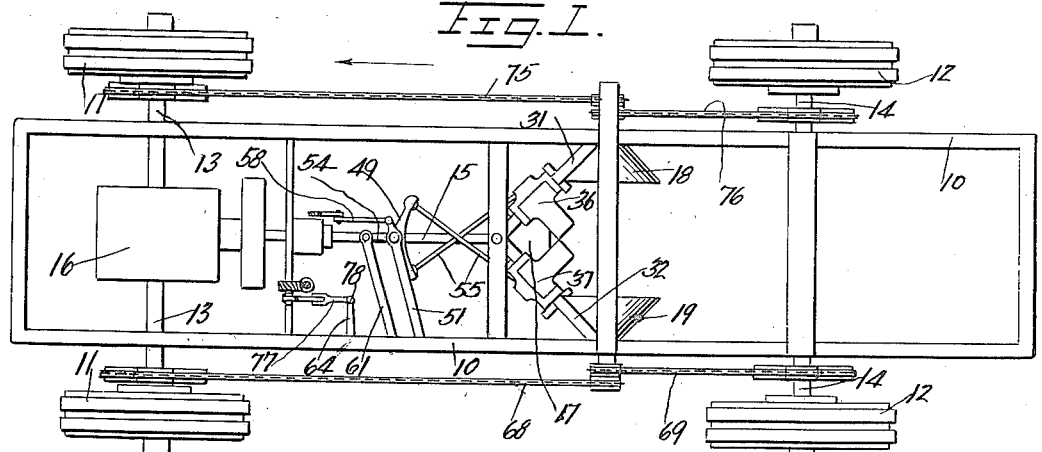

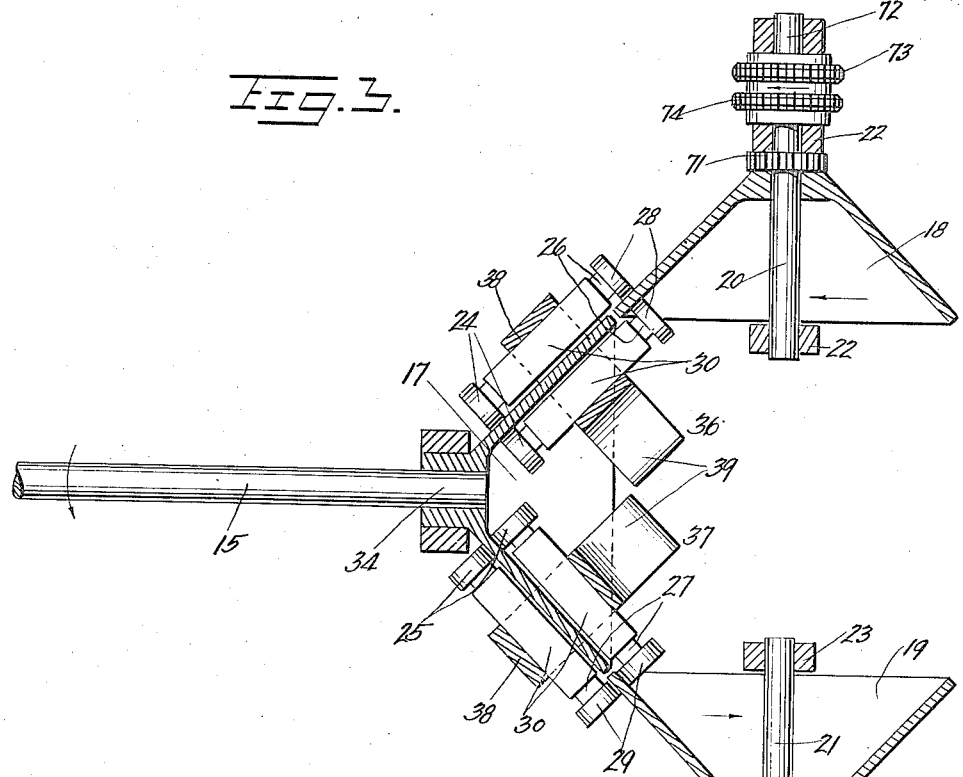

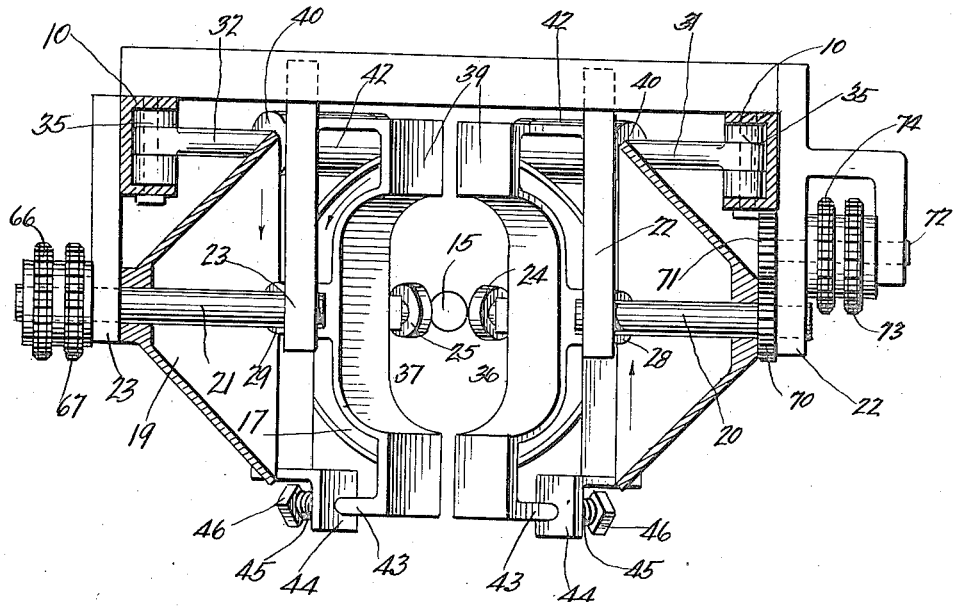
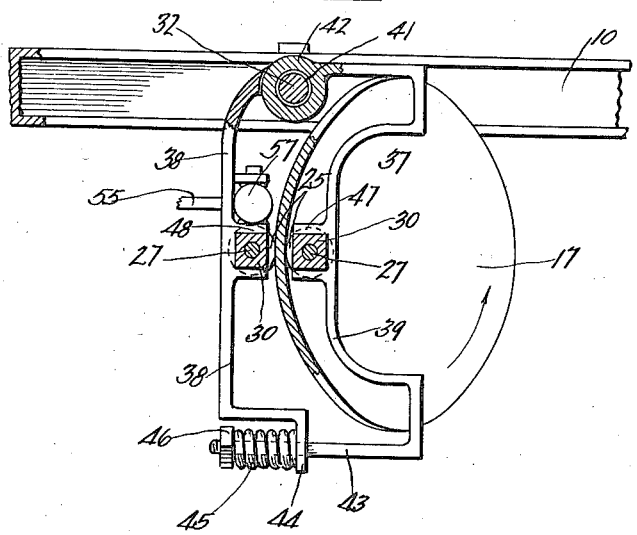

UNITED STATES PATENT OFFICE.

THOMAS WILLIAM DELANEY, OF ST. PAUL, MINNESOTA.

DRIVING AND STEERING GEAR FOR VEHICLES.

1,269,401.   Specification of Letters Patent.   Patented June 11, 1918.

Application filed January 21, 1918. Serial No. 212,962.

*To all whom it may concern:*

Be it known that I, THOMAS WILLIAM DELANEY, a citizen of the United States, and a resident of St. Paul, in the county of Ramsey and State of Minnesota, have invented a new and Improved Driving and Steering Gear for Vehicles, of which the following is a full, clear, and exact description.

This invention relates to power transmitting devices for power driven vehicles or other machines, and has particular reference to means for varying the speed of a machine or vehicle with respect to the driving or power element and also to the steering of the vehicle through the same or portion of the same instrumentalities.

More definitely stated my improvement has reference more especially to motor driven trucks having four wheels mounted on non pivotal supports, and having connections between the motor and all four of the wheels whereby not only will all four of the wheels be positively driven simultaneously, but in order to steer the vehicle the two wheels on either side may be caused to be driven at a higher speed than the other two.

A further object of the invention is to provide a power transmission and steering appliance for motor trucks having means whereby the transmission of the power from the motor to the wheels may be effected either through chain and sprocket gearing or through worm gearing.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of the running gear of a motor truck showing that form of my improvement in which sprocket gearing is used to transmit the power to the four wheels.

Fig. 2 is an enlarged view of the central portion of Fig. 1 showing the speed controlling means on a larger scale, Fig. 3 is a horizontal sectional view on the line 3—3 of Fig. 4.

Fig. 4 is a vertical longitudinal section on the line 4—4 of Fig. 2.

Fig. 5 is a vertical transverse section on the line 5—5 of Fig. 4.

Fig. 6 is a vertical sectional detail on the line 6—6 of Fig. 2.

Fig. 7 is a plan view of that adaptation of my invention in which worm gearing is used instead of chain gearing; and Fig. 8 is a vertical longitudinal section on the line 8—8 of Fig. 7.

Referring now more particularly to the drawings I show a frame 10 with which are associated front and rear wheels 11 and 12 through axles 13 and 14 adapted in any suitable manner for independent rotation, but held by suitable bearings from pivotal movement around vertical axes.

15 indicates a driving shaft shown in this instance as extending longitudinally along the central part of the frame and adapted to be operated at any suitable speed or direction from a motor 16 of conventional type.

Fixed to the rear end of the driving shaft 15 is a hollow cone 17, the connection between the driving cone and the shaft being at the apex of the cone. 18 and 19 indicate a pair of similar driven cones fixed upon a pair of coaxial shafts 20 and 21 respectively suitably supported in bearings 22 and 23. The axis of these two shafts 20 and 21 is transverse to the vehicle and hence perpendicular to the axis of the driven shaft 15 and preferably in the same horizontal plane thereof. The cones 18 and 19 are substantially equal in form and size to the driving cone 17, and the three cones are so arranged that they occupy positions with respect to one another so that either side of the shell of the driving cone is directed toward or lies in alinement with the adjacent side of the driven cone on the same side. See Fig. 3.' In other words each geometric element on either side of the driving cone that lies in the plane of the three shafts 15, 20 and 21 may be said to coincide in direction with the geometric element of the adjacent driven cone in the same plane.

Coöperating with the driving cone 17 are two pairs of friction wheels 24 and 25 fixed respectively to parallel shafts 26 and 27, the two wheels and their shafts of each pair lying on the inner and outer sides of the cone shell while the wheels have driving frictional engagement with the inner and outer surfaces of said shell. Fixed upon the rear or outer end of the axles 26 and 27 are other pairs of friction wheels 28 and 29 respectively which have driving frictional engagement with the inner and outer surfaces of the driven cones 18 and 19. With the parts arranged or adjusted as indicated in Fig. 3 and with the driving shaft and its cone operating at a normal or standard speed, the driving action will be transmitted through the pairs of friction wheels to the driven cones at the lowest speed since the wheels 24 and 25 are located as near as possible to the axis of the driving shaft and cone while the wheels 28 and 29 engage with the largest portions of the driven cones. From this condition it will be observed that if the friction wheels be adjusted outwardly so that the wheels 24 and 25 approach the largest portion of the driving cone and the wheels 28 and 29 approach the smallest portions of the driven cones the rate of speed will be increased in proportion.

The shafts 26 and 27 are journaled in bearing blocks 30. 31 and 32 indicate hanger bars whose front or inner ends are connected at 33 at a common point located directly above what may be called the point of connection 34 between the driving shaft and its cone, and the axes of the hanger bars 31 and 32 diverge rearwardly at an angle corresponding to the angle of divergence between the two driving elements of the cone 17. In other words the hanger bars are secured in a horizontal plane above the plane of the shafts 15, 20 and 21 and with their axes directly above the several sets of transmission wheels and their shafts 24 to 29. The outer end of the hanger bars may be fixed in any suitable manner as at 35 to the main frame 10.

Supported upon and adjustable along the hanger bars 31 and 32 are a pair of hangers 36 and 37. Each hanger comprises two main parts namely a bracket 38 and a bracket 39. The bracket 38 is provided at its upper end with a pair of spaced knuckles 40 mounted upon a sleeve 41 slidable along the hanger bar. The bracket 39 is provided at its upper end with a knuckle 42 likewise journaled upon the sleeve 41 and located between the two knuckles 40 of the other bracket. The lower end of the bracket 39 is provided with a bolt-like extension 43 which projects loosely through a hole in an extension 44 of the other bracket. A compression spring 45 is mounted upon the outer end of the extension 43 and the force of the spring is adjustably determined by means of a nut 46 threaded upon the extension 43. The tightening of the nut and thereby increasing the force of the spring causes the central portions of the brackets to approach each other. These central portions of the brackets are provided with guides or jaws 47 and 48 in which the bearing blocks 30 are secured.

49 indicates a three armed lever pivotally connected at 50 to a radius bar 51 fulcrumed at 52 upon one side member of the frame 10. This lever 49 is provided with a pair of ball sockets 53 at the outer ends of the laterally and rearwardly projecting arms, while the third arm 54 extends forward from the pivot 50 above and generally parallel to the driving shaft 15. A pair of rods 55 having ball shaped front ends 56 are connected to the socket ends 53 of the lever 49 and after crossing each other have their rear ends connected at any convenient points preferably adjacent to the jaws 48 of the hanger brackets 38 at points 57. It will thus be seen that the rods 55 have a general direction approximating that of the respective hanger bars 31 and 32. When, therefore, the three armed lever 49 and the parts connected therewith are moved bodily rearwardly as may be done for instance by means of a speed change controlling device including a rod 58 attached at 59 to an extension 60 of the radius bar 51, the two rods 55 push rearward and outward on the two hangers 36 and 37 connected thereto respectively whereby the pairs of friction wheels are shifted simultaneously toward the apexes of the driven cones 18 and 19 with the result in the change of speed above indicated. This simultaneous and equal sliding movement of the two hangers is insured by virtue of a link 61 having one end connected at 62 to the arm 54 and having its other end pivoted at 63 to a bell crank steering control lever 64 mounted upon a fixed pivot 65 as upon the side rail of the main frame 10 ahead of the fixed pivot 52. So far as the change of speed merely is concerned the point 63 may be regarded as a fixed point and so the radius bar 51 and link 61 will be swung parallel to each other around the pivots 52 and 63 maintaining the axis of the arm 54 approximately parallel to the axis of the driving shaft. The slight throw of the arm 54 laterally of the normal vertical central plane, due to the swinging of the lever 49 around the centers 52 and 63, is so slight as to be practically negligible so far as the mere change of speed is concerned.

Referring now to Figs. 1, 3 and 5 it is to be noted that the driven shaft 21 has connected to its outer end a pair of sprocket wheels 66 and 67 from which chains 68 and 69 lead to the hubs of the front and rear wheels on that side of the frame. On the other side the shaft 20 carries a gear 70 meshing with a similar gear 71 secured to a jack shaft 72 to which are secured a pair of sprocket gears 73 and 74 from which other chains 75 and 76 lead to the front and rear wheels on the right side of the vehicle. The action of the driving cone, as will be understood from the above description causes the rotation of the driven cones in opposite directions, hence the interposition of the jack shaft 72 and gears through which it is driven in the same direction as the shaft 21. Thus all four of the wheels are driven simultaneously and in the same direction.

In order to steer the machine I provide any suitable means including a rod 77 pivoted at 78 to swing the bell crank around its pivot 65. This through the link connection 61 serves to swing the main three armed lever 49 around its pivot 50. Thus the driving speed at one side of the machine will be increased simultaneously with the decrease of the speed thereof on the other side and when the wheels on one side of the machine are sped up they obviously become the means for propelling that side of the vehicle faster than the wheels on the inner or other side and thus the machine is turned through an arc of a circle. The sharpness of this control will depend upon the disparity of speed ratio between the two driven sides of the transmission device. While the change speed control and the steering control may be operated simultaneously to perform their desired independent functions, yet one part of each of these controlling devices may be regarded as a practically fixed fulcrum about which the other controlling device is operated, that is to say for all practical purposes the point 63 may be regarded as a fixed point during the simple speed change, but for the purpose of the steering of the vehicle the points 50 and 59 are practically stationary.

Attention is now called to the modification in Figs. 7 and 8 in which the driving and controlling devices are or may be identical with those already described in detail. So far as they are identical the same reference characters are applied. In this form of the invention I employ a pair of longitudinal worm shafts 79 and 80 on the right and left sides respectively of the vehicle which are provided with worms 81 and 82 respectively of opposite character thus doing away with the necessity of a jack shaft such as indicated at 72. These worms coöperate with worm wheels 83 and 84 respectively for driving the wheels in the same direction. The driving cone 17 transmits its power through friction wheels 24', 25', 28', and 29' to the driven cones 18 and 19' respectively, fixed to the parallel worm shafts 79 and 80. In this form the apexes of the driven cones are both directed in the same direction and in the direction opposite to the apex of the driving cone, but as in the other form the effective geometric elements of the driving and driven cones lying in the same horizontal plane are in alinement with each other respectively so that the shift of the pairs of driving wheels journaled in bearing blocks 30' will result in the same speed and steering control as in the main form of the invention. The hangers 36' and 37' are supported upon and slidable along double hanger bars 31' and 32'.

I claim:

1. In transmission mechanism, the combination of a driving cone, a driven cone, driving and driven shafts upon which the cones are respectively connected, said shafts being out of alinement with each other but in the same plane, while the active elements of the driving and driven cones in said plane are in alinement with each other, and friction means coöperating with the surfaces of the driving and driven cones serving to transmit the power from one cone to the other.

2. In transmission mechanism, the combination of a driving shaft, a hollow driving cone fixed at its apex to the driving shaft, a hollow driven cone, a driven shaft to which the driven cone is connected out of alinement with the driving shaft, pairs of friction wheels coöperating with the inner and outer surfaces of the two cones respectively, and means to support the friction wheels whereby the power from the driving cone is transmitted to the driven cone.

3. In transmission mechanism, the combination of a power shaft, a hollow driving cone having its apex end fixed to the power shaft, a pair of hollow driven cones having their axes out of alinement with the power shaft but on opposite sides of the axis thereof, pairs of friction wheels coöperating with the shell of the driving cone and the adjacent portions of the driven cones respectively, and means to shift the friction wheels toward and from the apex of the driving cone.

4. In power transmission devices, the combination of a hollow driving cone, a pair of hollow driven cones on opposite sides of the axis of the driving cone, the axes of all of the cones lying in the same plane and the active geometric elements of the three cones lying in said plane, pairs of friction wheels bearing upon the inner and outer surfaces of the driving and the driven cones whereby the power of the driving cone is transmitted to the driven cones, and means to shift the aforesaid friction wheels simultaneously toward and from the apexes of the driven cones.

5. In power transmission devices, the combination of a hollow driving cone, a pair of hollow driven cones on opposite sides of the axis of the driving cone, the axes of all of the cones lying in the same plane and the active geometric elements of the three cones lying in said plane, pairs of friction wheels bearing upon the inner and outer surfaces of the driving and the driven cones whereby the power of the driving cone is transmitted to the driven cones, and means to shift said friction wheels simultaneously toward the apex of one driven cone and away from the apex of the other driven cone.

THOMAS WILLIAM DELANEY.